US010757482B2

(12) United States Patent
Lee et al.

(10) Patent No.: US 10,757,482 B2
(45) Date of Patent: Aug. 25, 2020

(54) SYSTEM AND METHOD FOR PREDICTING USER VIEWPOINT USING LOCATION INFORMATION OF SOUND SOURCE IN 360 VR CONTENTS

(71) Applicant: Fdn. for Res.&Bus., Seoul Nat. Univ. of Sci.&Tech., Seoul (KR)

(72) Inventors: Ye Hoon Lee, Seoul (KR); Seung Ho Choi, Seoul (KR); Dong Ho Kim, Seoul (KR); Eunyoung Jeong, Daejeon (KR); Deokgyu Yun, Seoul (KR)

(73) Assignee: Fdn. For Res.&Bus., Seoul Nat. Univ. Of Sci.&Tech., Seoul (KR)

( * ) Notice: Subject to any disclaimer, the term of this patent is extended or adjusted under 35 U.S.C. 154(b) by 0 days.

(21) Appl. No.: 16/204,894

(22) Filed: Nov. 29, 2018

(65) Prior Publication Data
US 2019/0200097 A1    Jun. 27, 2019

(30) Foreign Application Priority Data

Dec. 5, 2017  (KR) .................. 10-2017-0166031
Nov. 27, 2018 (KR) .................. 10-2018-0148834

(51) Int. Cl.
*H04N 21/235* (2011.01)
*H04N 21/426* (2011.01)
*H04N 21/435* (2011.01)
*H04N 21/437* (2011.01)
(Continued)

(52) U.S. Cl.
CPC ....... *H04N 21/816* (2013.01); *H04N 21/2353* (2013.01); *H04N 21/42607* (2013.01);
(Continued)

(58) Field of Classification Search
CPC ............. H04N 21/8456; H04N 21/816; H04N 21/8586; H04N 21/23439; H04N 21/435;
(Continued)

(56) References Cited

U.S. PATENT DOCUMENTS

2019/0230142 A1\*  7/2019  He ................... H04L 65/4084
2019/0349627 A1\*  11/2019 Di ................... H04N 21/4516

OTHER PUBLICATIONS

Author: Ozcinar, Title: Viewport-aware adaptive 360° video streaming using tiles for virtual reality, Date: Nov. 7, 2017 (Year: 2017).\*
(Continued)

*Primary Examiner* — Hsiungfei Peng
(74) *Attorney, Agent, or Firm* — HoustonHogle LLP

(57) ABSTRACT

There is disclosed a system and method of predicting a location of a user's viewport using location information of a sound source in 360 virtual reality (VR) content. According to the present invention, the spatial representation description (SRD) and the sound source localization information (SLI) of the audio MPD are transmitted with the video MPD being extended, the SRD of the sound source is used to derive the location of the sound source, and the weights of the respective items of the region of interest (ROI), the sound source localization information (SLI), the current viewport, and the pole are allocated differentially according to the bandwidth condition and then multiplied by the reference bitrate to determine the segment bitrate to be provided next, thereby improving the accuracy of predicting the location of the user's viewport and ensuring the quality of experience (QoE) for regeneration speed and regeneration quality.

12 Claims, 4 Drawing Sheets

(51) Int. Cl.
   *H04N 21/442*   (2011.01)
   *H04N 21/647*   (2011.01)
   *H04N 21/6373*  (2011.01)
   *H04N 21/81*    (2011.01)
   *H04N 21/845*   (2011.01)
   *H04N 21/858*   (2011.01)
   *H04N 21/61*    (2011.01)

(52) U.S. Cl.
   CPC ......... *H04N 21/435* (2013.01); *H04N 21/437* (2013.01); *H04N 21/44213* (2013.01); *H04N 21/6125* (2013.01); *H04N 21/6373* (2013.01); *H04N 21/64738* (2013.01); *H04N 21/8456* (2013.01); *H04N 21/8586* (2013.01)

(58) Field of Classification Search
   CPC ....... H04N 21/44213; H04N 21/42607; H04N 21/437; H04N 21/2353
   See application file for complete search history.

(56) References Cited

OTHER PUBLICATIONS

Niamut, O.A., et al., "MPEG DASH SRD—Spatial Relationship Description," MMSys '16 Proceedings of the 7th International Conference on Multimedia Systems, 5 (2016).

Ozcinar, C., et al., "Viewport-Aware Adaptive 360 Degree Video Streaming Using Tiles for Virtual Reality," IEEE International Conferece on Image Processing (2017).

Jeong, E. et al., "An Method of Viewport Prediction and Bitrate Allocation based on Angle Information in 360 VR Contents," Academic Conference, Nov. 5, 2018.

Jeong, E. et al., "Viewport Prediction Method of 360 VR Video using Sound Localization Information," The Tenth International Conference on Ubiquitous and Future Networks (ICUFN 2018) Jul. 3, 2018.

* cited by examiner

| Essential Property@value or Supplemental Property@value parameter | Description |
|---|---|
| source_id | non-negative integer in decimal representation providing an identifier for the source of the content and implicitly defining a coordinate system |
| object_x | non-negative integer in decimal representation expressing the horizontal position of the top-left corner of the associated media assets in the coordinate system |
| object_y | non-negative integer in decimal representation expressing the vertical position of the top-left corner of the associated media assets in the coordinate system |
| object_width | non-negative integer in decimal representation expressing the width of the associated media assets in the coordinate system |
| object_height | non-negative integer in decimal representation expressing the height of the associated media assets in the coordinate system |
| total_width | optional non-negative integer in decimal representation expressing the width of the extent of all media assets in the coordinate system |
| total_height | optional non-negative integer in decimal representation expressing the height of the extent of all media assets in the coordinate system |
| spatial_set_id | optional non-negative integer in decimal representation providing an identifier for a group of media assets. |

FIG. 3

| Essential Parameter | Description |
|---|---|
| SLI_id | identifier of SLI, decimal number |
| sound_x | x value of location of sound source in 360 degree space |
| sound_y | y value of location of sound source in 360 degree space |
| sound_z | z value of location of sound source in 360 degree space |
| Panning model | panning model of sound source panel("HRTF" or "equal power") |

FIG. 4

| Essential parameter | Description |
|---|---|
| sound_R | This provides information on the right phase of the sound source in 360VR content. |
| sound_L | This provides information on the left phase of the sound source in 360VR content. |
| sound_spatial_hori | This provides horizontal angle information for the user to sense the sound source in 360VR content. |
| sound_spatial_verti | This provides vertical angle information for the user to sense the sound source in 360VR content. |

FIG. 5

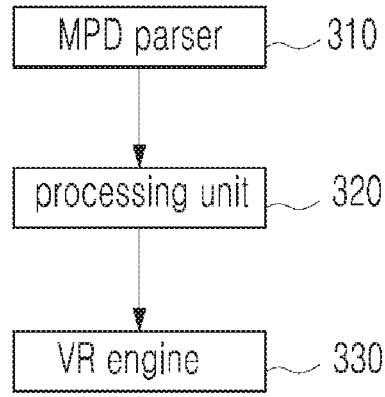

FIG. 6

(1) If $r = 1$ then
- $w_S, w_R, w_V, w_P \leftarrow \max(w_x)$
- $\sum_{i=1}^{N} R_i = \sum_{i=1}^{N}(\max(w_x) * t_i * R_f)$ (2) else If $r = 2$ then
- $w_S, w_R, w_V \leftarrow \max(w_x)$
- $w_P \leftarrow \max(w_x) - 1$
- $\sum_{i=1}^{N} R_i = \sum((S + R + V) * R_f * \max(w_x) + P * R_f * (\max(w_x) - 1))$ (3) else If $r = 3$ then
- $w_S, w_R \leftarrow \max(w_x)$
- $w_V, w_P \leftarrow \max(w_x) - 1$
- $\sum_{i=1}^{N} R_i = \sum((S + R) * R_f * \max(w_x) + (P + V) * R_f * (\max(w_x) - 1))$ (4) else If $r = 4$ then
- $w_S, w_R \leftarrow \max(w_x)$
- $w_V \leftarrow \max(w_x) - 1$
- $w_P \leftarrow \max(w_x) - 2$
- $\sum_{i=1}^{N} R_i = \sum((S + R) * R_f * \max(w_x) + V * R_f * (\max(w_x) - 1) + P * R_f * (\max(w_x) - 2))$

FIG. 7

SYSTEM AND METHOD FOR PREDICTING USER VIEWPOINT USING LOCATION INFORMATION OF SOUND SOURCE IN 360 VR CONTENTS

CROSS REFERENCE TO RELATED APPLICATION

The present application claims priority to Korean Patent Application Nos. 10-2017-0166031, filed Dec. 5, 2017, and 10-2018-0148834, filed Nov. 27, 2018, the entire content of which is incorporated herein for all purposes by this reference.

BACKGROUND OF THE INVENTION

Field of the Invention

The present invention relates to a system and method of predicting a location of a user's viewport using location information of a sound source in 360 virtual reality (VR) content. More particularly, the present invention relates to a technique in which video and audio in a user's current viewport are compression-coded and transmitted to a hypertext transport protocol (HTTP) server using dynamic adaptive streaming over HTTP (DASH) segment tiles, weights are differentially allocated to respective items of a region of interest (ROI), a sound source localization information (SLI), a current viewport, and a pole according to bandwidth conditions for the received segment tiles and multiplied by a reference bitrate to determine a segment bitrate to be provided next and transmit the determined bitrate to the HTTP server, thereby improving the accuracy of predicting the location of the user's viewport and providing realistic VR service.

Description of the Related Art

Recently, with the development of devices such as smart phones, social interest in virtual reality technology (hereinafter, referred to as VR technology) is increasing. The VR technology is one of technologies that have recently received attention as a technology to overcome the limitations of existing technology by increasing the fidelity of representations of simulated objects to overcome a difference between reality and the virtual system.

360 VR content is provided through DASH media presentation description (MPD) over a network. That is, the DASH is an adaptive bit-rate streaming technique that enables media data streaming through the Internet from web servers using an HTTP technique.

Herein, the MPD allocates an adaptation set to the audio and video streams within a period, allocates a description set to each resolution in the adaptation set, divides each of the allocated adaptation set and description set into segments on a per-second basis, and then stores the resulting in a HTTP server 10.

On the other hand, the HTTP server divides one frame of video spatially, in which each tile is compression-coded through high-efficiency video codec (HEVC) and then transmitted at different resolutions.

Accordingly, when the client device performs parsing of a media presentation description (MPD) provided from the HTTP engine and generates a MPD request command together with a uniform resource locator (URL) included in the MPD to make a request for the corresponding content, the HTTP server provides a segment of lowest resolution and then adaptively provides segments according to network conditions and parameters. When a network condition is good, it makes a request for a high quality segment, and when the network situation is bad, it makes a request for a low quality segment.

However, the 360 VR content produced using the VR technology has a limitation in higher bandwidth consumption compared to the existing 2D content.

Accordingly, since there are various methods in which a location of a user's current viewport including a region of interest (ROI) of a user is predicted by using tiling in a high efficiency video codec, tiles or the viewport are transmitted with high image quality, and remaining tiles are transmitted with low image quality, thereby reducing the bandwidth, the location of a user's current viewport can be predicted by utilizing the moving object image using this method. For example, when a car moves, tiles of the moving car are transmitted with high image quality and tiles of the remaining background are transmitted with low image quality.

However, there is no technology that reflects a sound source of the user's viewport upon virtual reality service so that the user senses the sensations of direction, distance, and space of the sound source.

SUMMARY OF THE INVENTION

Accordingly, the present invention has been made keeping in mind the above problems occurring in the prior art, and an object of the present invention is to provide a system and method of predicting a location of a user's viewport using location information of a sound source in 360 VR content, by which high bitrate can be allocated to reduce a bandwidth, the accuracy of predicting a location of user's viewport can be improved, and user's satisfaction for regeneration speed and regeneration quality can be ensured, when providing realistic audio by adding the realistic audio to virtual reality service in three dimensional manner.

It is an object of the present invention to provide a system and method of predicting a location of user's viewport using location information of a sound source in 360 VR content, by which the immersion and interest in virtual reality service can be improved due to stereophonic sound provided by the present invention.

The objects of the present invention are not limited to the above-mentioned objects, and other objects and advantages of the present invention which are not mentioned can be understood by the following description, and will be more clearly understood by embodiments of the present invention. It will also be readily apparent that the objects and advantages of the invention may be realized and attained by means disclosed in the appended claims and combinations thereof.

In order to achieve the above-mentioned objects, a system for predicting a location of a user's viewport using location information of a sound source in 360 virtual reality (VR) content according to an aspect of the present invention includes a content production unit spatially dividing a panorama video in a form of an enterprise resource planning (ERP) into multiple segment tiles to generate an MPD including a video media presentation description (MPD) and an audio MPD, compression-coding the generated MPD and the segment tiles at resolutions determined for respective tiles to be transmitted in a form of media data; a HTTP server dividing the received media data into segments on a per-predefined time basis, transmitting the generated MPD including the video MPD and the audio MPD and the segment tiles with a reference bandwidth of a network, and then collecting next segment tiles on the basis of a MPD request command provided through the network to transmit the segment tiles and the MPD; and a client device generating the MPD request command together with a uniform resource locator (URL) included in the MPDs received through the network to be transmitted to the HTTP server, predicting the location of the user's viewport on the basis of the segment tiles and the video MPD and the audio MPD received through the network, determining a segment bitrate to be provided next adaptively on the basis of bandwidth conditions, and transmitting the determined segment bitrate to the HTTP server.

Preferably, the audio MPD may include spatial representation description (SRD) and sound localization information (SLI), in which the SRD includes source_id (non-negative integer in a decimal representation providing an identifier for a source of content and implicitly defining a coordinate system), object_x (non-negative integer in decimal representation expressing a horizontal location of a top-left corner of associated media assets in the coordinate system), object_y (non-negative integer in decimal representation expressing a vertical location of a top-left corner of the associated media assets in the coordinate system), object_width (non-negative integer in decimal representation expressing a width of the associated media assets the coordinate system), object_height (non-negative integer decimal representation expressing a height of the associated media assets in the coordinate system), total_width (optional non-negative integer in decimal representation expressing a width of the extent of all media assets in the coordinate system), total_height (optional non-negative integer in decimal representation expressing a height of the extent of all media assets in the coordinate system), and spatial_set_id (optional non-negative integer in decimal representation providing an identifier for a group of media assets).

A sound localization information description (SLID) may include a sound source localization identifier (SLI_id), a location (x, y, z axis value) of the sound source in a 360-degree space having sound_R (information on right phase of the sound source in 360 VR content), sound_L (information on left phase of the sound source in 360 VR content), sound_spatial_hori (horizontal angle information for a user to sense the sound source in 360 VR content), and sound_spatial_verti (vertical angle information for the user to sense, and a panning model.

Preferably, the client device may include a MPD parser parsing the MPD through the network; a processing unit predicting the location of the user's viewport on the basis of the video MPD and the audio MPD of the parsed MPD and determining a segment bitrate to be provided next adaptively on the basis of the bandwidth conditions to transmit the determined bitrate of the segment to the HTTP server; and a VR engine decoding the segment received through the processing unit to acquire audio and video and three-dimensionally rendering the acquired audio and video in the 360-degree space to be regenerated.

Preferably, the processing unit may be configured to determine the segment bitrate to be provided next on the basis of a weight of a tile for at least one item of a region of interest (ROI), sound source localization information (SLI), a current viewport, and a pole, a reference bitrate, a rank for each bandwidth condition, and tiles located in the ROI, the SLI, the current viewport, and the pole, and transmit the determined bitrate to the HTTP server.

Preferably, the weights in the processing unit may be stored in such a manner as to be matched to respective items of the ROI, the SLI, the current viewport, and the pole that are predetermined for each bandwidth condition.

The processing unit may be provided to determine that the bandwidth condition is very good when a rank r derived from the sum of weights of respective items is one, set each of the weight $w_S$ of the tile corresponding to the SLI, the weight $W_R$ of the tile corresponding to the ROI, the weight $w_V$ of the tile corresponding to the current viewport, and the weight $w_P$ of the tile corresponding to the pole as a maximum weight set $w_X$, and derive a bitrate $R_i$ of an i-th tile from the total sum of products of the maximum weight max $w_X$, the i-th tile $t_i$, and the reference bitrate $R_f$.

The processing unit may be provided to determine that the bandwidth condition is good when the rank r derived from the sum of weights of respective items is two, set the weight $w_S$ of the tile corresponding to the SLI, the weight $w_R$ of the tile corresponding to the ROI, and the weight $w_V$ of the tile corresponding to the current viewport as the maximum weight set max $w_X$ and set the weight $w_P$ of the tile corresponding to the pole as a value of max $w_X-1$ obtained by subtracting one from the maximum weight set max $w_X$, and derive the segment bitrate $R_i$ by adding a product of the sum (S+R+V) of the tiles of each of the ROI, the SLI, and the current viewport, the reference bitrate $R_f$ and the maximum weight max $w_X$ and a product of tile P of the pole in frequency domain, the reference bitrate $R_f$ and a value of max $w_X-1$ obtained by subtracting one from the maximum weight set max $w_X$.

The processing unit may be provided to determine that the bandwidth condition is bad when the rank r derived from the sum of the weights of respective items is three, set the weight $w_S$ of the tile corresponding to the SLI and the weight $w_R$ of the tile corresponding to the ROI as the maximum weight set max $w_X$ and set the weight $w_V$ of the tile corresponding to the current viewport and the weight $w_P$ of the tile corresponding to the pole as a value of max $w_X-1$ obtained by subtracting one from the maximum weight set max $w_X$, and derive the segment bitrate $R_i$ for the image set R by adding a product of the sum S+R of tiles of each times of the ROI and the SLI, the reference bitrate $R_f$ and the maximum weight max $w_X$ and a product of the sum V+P of the tile V of the current viewport and the tile P in the pole in frequency domain, the reference bitrate $R_f$ and a value of max $w_X-1$ obtained by subtracting 1 from the maximum weight set max $w_X$.

The processing unit may be provided to determine that the bandwidth condition is very bad when the rank r derived from the sum of the weights of respective items is four, set the weight $w_S$ of the tile corresponding to the SLI and the weight $w_R$ of the tile corresponding to the ROI as the maximum weight set $w_X$, set the weight $w_V$ of the tile corresponding to the current viewport as a value of max $w_X-1$ obtained by subtracting one from the maximum weight set max $w_X$, and set the weight $w_P$ of the tile corresponding to the pole as a value of max $w_X-2$ obtained by subtracting two from the maximum weight set max $w_X$, and derive the segment bitrate $R_i$ for the image set R by adding a product of the sum S+R of the tiles of the ROI and the SLI, the reference bitrate $R_f$ and the maximum weight max $w_X$, a product of the tile V of the current viewport, the reference bitrate $R_f$ and a value of max $w_X-1$ obtained by subtracting one from the maximum weight set max $w_X$, and a product or the tile P of the pole in frequency domain, the reference bitrate $R_f$ and a value of max $w_X-2$ obtained by subtracting two from the maximum weight set max $w_X$.

A method of predicting a location of a user's viewport using location information of a sound source in 360 virtual reality (VR) content according to another aspect of the present invention includes (a) by a content production unit, spatially dividing a panorama video in a form of an enterprise resource planning (ERP) into multiple segment tiles to generate an MPD for each tile and compression-coding the generated MPD and the segment tiles at resolutions for respective tiles to transmit the resulting in a form of media data to a HTTP server; (b) by the HTTP server, dividing the received media data into segments on a per-predefined time basis in accordance with a MPD request command together with a uniform resource locator (URL) included in the MPD received through a network and then transmitting the MPD including a video MPD and an audio MPD and the segment tiles to a client device with a reference bandwidth of the network; (c) by the client device, predicting the location of the user's viewport on the basis of the segment tiles and the video MPD and the audio MPD received through the network, determining a segment bitrate to be provided next adaptively on the basis of bandwidth condition, and making a request for a segment tile in the location of the user's viewport predicted at the determined segment bitrate to the HTTP server; (d) by the HTTP server, transmitting a segment to be provided next to the client device with an allocated bandwidth provided by the client device; and (e) by the client device, performing decoding on the segment tiles transmitted through the network to acquire video and audio, and rendering the acquired video and audio in a 360-degree space to be regenerated.

Preferably, the audio MPD may include spatial representation description (SRD) and sound localization information (SLI), in which the SRD includes source_id (non-negative integer in a decimal representation providing an identifier for a source of content and implicitly defining a coordinate system), object_x (non-negative integer in decimal representation expressing a horizontal location of a top-left corner of associated media assets in the coordinate system), object_y (non-negative integer in decimal representation expressing a vertical location of a top-left corner of the associated media assets in the coordinate system), object_width (non-negative integer in decimal representation expressing a width of the associated media assets in the coordinate system), object_height (non-negative integer in decimal representation expressing a height of the associated media assets in the coordinate system), total_width (optional non-negative integer in decimal representation expressing a width of the extent of all media assets in the coordinate system), total_height (optional non-negative integer in decimal representation expressing a height of the extent of all media assets in the coordinate system), and spatial_set_id (optional non-negative integer in decimal representation providing an identifier for a group of media assets).

A sound localization information description set (SLID) may include a sound source localization identifier (SLI_id), a location (x, y, z axis value) of the sound source in a 360-degree space having sound_R (information on right phase of the sound source in 360 VR content), sound_L (information on left phase of the sound source 360 VR content), sound_spatial_hori (horizontal angle information for a user to sense the sound source in 360 VR content), and sound_spatial_verti (vertical angle information for the user to sense, and a panning model.

In addition, the step (c) may be configured to determine the segment bitrate to be provided next on the basis of a weight of a tile for at least one item of a region of interest (ROI), sound source localization information (SLI), a current viewport, and a pole, a reference bitrate, a rank for each bandwidth condition, and tiles located in the ROI, the SLI, the current viewport, and the pole, and transmit the determined bitrate to the HTTP server.

In addition, the weights in the step (c) may be stored in such a manner as to be matched to respective items of the ROI, the SLI, the current viewport, and the pole that are predetermined for each bandwidth condition.

The step (c) may be provided to determine that the bandwidth condition is very good when a rank r derived from the sum of weights of respective items is one, set each of the weight $w_S$ of the tile corresponding to the SLI, the weight $w_R$ of the tile corresponding to the ROI, the weight $w_V$ of the tile corresponding to the current viewport, and the weight $w_P$ of the tile corresponding to the pole as a maximum weight set $w_X$, and derive a bitrate $R_i$ of an i-th tile from the total sum of products of the maximum weight max $w_X$, the i-th tile $t_i$, and the reference bitrate $R_f$.

The step (c) may be provided to determine that the bandwidth condition is good when the rank r derived from the sum of weights of respective items is two, set the weight $w_S$ of the tile corresponding to the SLI, the weight $w_R$ of the tile corresponding to the ROI, and the weight $w_V$ of the tile corresponding to the current viewport as the maximum weight set max $w_X$ and set the weight $w_P$ of the tile corresponding to the pole as a value of max $w_X-1$ obtained by subtracting one from the maximum weight set max $w_X$, and derive the segment bitrate $R_i$ by adding a product of the sum (S+R+V) of the tiles of each of the ROI, the SLI, and the current viewport, the reference bitrate $R_f$ and the maximum weight max $w_X$ and a product of tile P of the pole in frequency domain, the reference bitrate $R_f$ and a value of max $w_X-1$ obtained by subtracting one from the maximum weight set max $w_X$.

In addition, the step (c) may be provided to determine that the bandwidth condition is bad when the rank r derived from the sum of the weights of respective items is three, set the weight $w_S$ of the tile corresponding to the SLI and the weight $w_R$ of the tile corresponding to the ROI as the maximum weight set max $w_X$ and set the weight $w_V$ of the tile corresponding to the current viewport and the weight $w_P$ of the tile corresponding to the pole as a value of max $w_X-1$ obtained by subtracting one from the maximum weight set max $w_X$, and derive the segment bitrate $R_i$ for the image set R by adding a product of the sum S+R of tiles of each times of the ROI and the SLI, the reference bitrate $R_f$, and the maximum weight max $w_X$ and a product of the sum V+P of the tile V of the current viewport and the tile P in the pole in frequency domain, the reference bitrate $R_f$ and a value of max $w_X-1$ obtained by subtracting 1 from the maximum weight set max $w_X$.

In addition, the step (c) may be provided to determine that the bandwidth condition is very bad when the rank r derived from the sum of the weights of respective items is four, set the weight $w_S$ of the tile corresponding to the SLI and the weight $w_R$ of the tile corresponding to the ROI as the maximum weight set $w_X$, set the weight $w_V$ of the tile corresponding to the current viewport as a value of max $w_X-1$ obtained by subtracting one from the maximum weight set max $w_X$, and set the weight $w_P$ of the tile corresponding to the pole as a value of max $w_X-2$ obtained by subtracting two from the maximum weight set max $w_X$, and derive the segment bitrate $R_i$ for the image set R by adding a product of the sum S+R of the tiles of the ROI and the SLI, the reference bitrate $R_f$ and the maximum weight max $w_X$, a product of the tile V of the current viewport, the reference bitrate $R_f$ and a value of max $w_X-1$ obtained by subtracting one from the maximum weight set max $w_X$, and a product of the tile P of the pole in frequency domain, the reference bitrate $R_f$ and a value of max $w_X-2$ obtained by subtracting two from the maximum weight set max $w_X$.

According to the present invention, the spatial representation description (SRD) and the sound source localization information (SLI) of the audio MPD are transmitted with the video MPD being extended, the SRD of the sound source is used to derive the location of the sound source, and the weights of the respective items of the region of interest (ROI), the sound source localization information (SLI), the current viewport, and the pole are allocated differentially according to the bandwidth condition and then multiplied by the reference bitrate to determine the segment bitrate to be provided next, whereby as the next segment tile is received at the determined segment bitrate, it is possible to improve the accuracy of predicting the location of the user's viewport by utilizing the visual and auditory perception and when the prediction of the location of the user's viewport fails, the location of the user's viewport can be predicted considering the user's current viewport, thereby ensuring the quality of experience (QoE) for regeneration speed and regeneration quality. As a result, a great improvement is brought about in terms of the accuracy and reliability of operation and further performance efficiency, and the system for providing the VR service has a sufficient possibility of being marketed or operated, whereby the present invention has industrial applicability.

According to the present invention, since the audio of the real environment is three-dimensionally reflected in the virtual reality and provided to the user, there are advantages that the senses of direction, distance, and space for the virtual reality can be felt to be the same as the actual environment to provide a realistic virtual reality service, and accordingly the immersion and interest in the virtual reality service can be further improved.

BRIEF DESCRIPTION OF THE DRAWINGS

The accompanying drawings with respect to the specification illustrate preferred embodiments of the present invention and serve to further understand the technical idea of the present invention together with the description of the present invention given below, and accordingly the present invention should not be construed as limiting only to those described in the drawings, in which:

FIG. 3 is a table showing a configuration of an SRD in a viewport prediction system according to an embodiment of the present invention;

FIG. 4 is a table showing a configuration of an SLID in a viewport prediction system according to an embodiment of the present invention;

FIG. 5 is a table showing location information of a sound source of an SLID according to an embodiment of the present invention;

FIG. 6 is a diagram showing a detailed configuration of a client device of a system according to an embodiment of the present invention; and FIG. 7 is a diagram showing an algorithm for determining a segment bitrate according to an embodiment of the present invention.

DETAILED DESCRIPTION OF THE INVENTION

Figure 1:
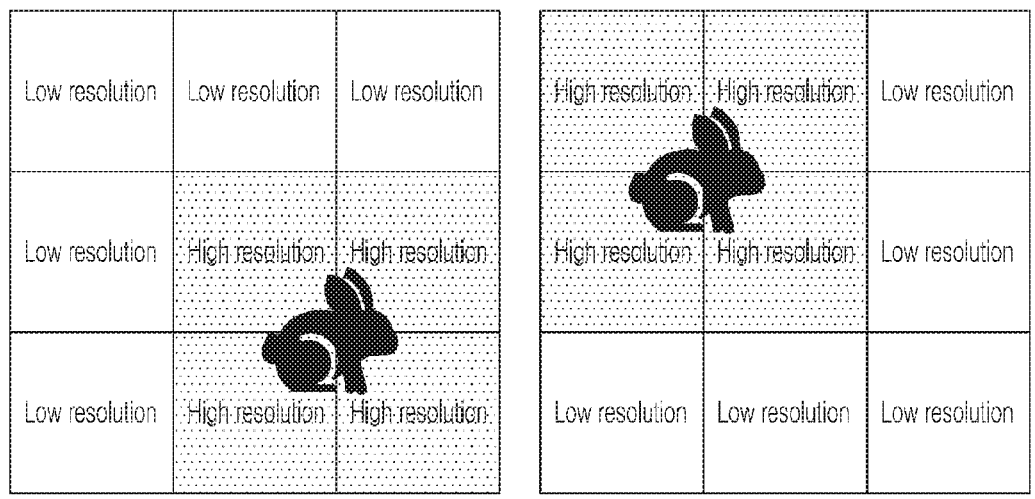
FIG. 1 is an exemplary diagram showing segment tiles of 360 VR content in the related art.

Hereinafter, embodiments of the present invention will be described in detail with reference to the drawings.

The advantages and features of the present invention, and how to achieve them, will become apparent with reference to the embodiments described below with reference to the accompanying drawings. The present invention may, however, embodied in many different forms and should not be construed as limited to the embodiments set forth herein. Rather, these embodiments are provided so that this disclosure will be thorough and complete, and will fully convey the scope of the invention to those skilled in the art. To fully disclose the scope of the invention to those skilled in the art, the invention is only defined by the scope of the claims.

The terms used in this specification will be briefly described, and the present invention will be described in detail.

While the terms used in the present invention are selected from the general terms that are widely used at present, considering the functions of the present invention, they may vary depending on the intentions or precedents of engineers employed in the field, the emergence of new technologies, and the like. In addition, in certain cases, there may be a term arbitrarily selected by the applicant, and the meaning thereof will be described in detail in the description of the corresponding invention. Therefore, a term used in the present invention should be defined on the basis of not the name of a simple term, but on the meaning of the term and the entire content of the present invention.

When an element "includes" other elements throughout the specification, it is to be understood that the element may include other elements as well, without departing from the other element unless specifically stated to the contrary. Further, the term "unit" used in the specification means a hardware component such as software, FPGA or ASIC, and "unit" plays a certain role. However, the "unit" is not meant to be limited to software or hardware. The "unit" may be configured to reside on an addressable storage medium and may be configured to regenerate one or more processors.

Accordingly, by way of an example, the "unit" refers to components such as software components, object oriented software components, class components and task components, segments of processors, functions, attributes, procedures, subroutines, and program code, drivers, firmware, microcode, circuitry, data, databases, data structures, tables, arrays, and variables. The functions provided in the components and the "units" may be combined by a smaller number of components and "units" or further divided into additional components and "units".

Hereinafter, embodiments of the present invention will be described in detail with reference to the accompanying drawings so that a person having ordinary skill in the art may carry out easily. In order to clearly explain the present invention in the drawings, parts not related to the description will be omitted.

In this embodiment, the network may transmit Internet Protocol (IP) packets, frame relay frames, asynchronous transfer mode (ATM) cells, or other information between network addresses. The network may also be a heterogeneous network that includes broadcast networks, such as cable and satellite communication links. The network may include one or more local area networks (LANs), metropolitan area networks (MAN), wide area networks (WAN), all or a portion of a global network, or any other communication system or systems in one or more locations.

In various embodiments, the heterogeneous network includes a broadcast network and a broadband network. The broadcast network is designed for broadcast of media data to client devices, which is generally one way, e.g., from one or more servers to client devices. The broadcast network may include any number of broadcast links and devices, such as, for example, satellite, wireless, wired, and fiber-optic network links and devices.

The broadband network is designed for broadband accessing to media data for client devices, wherein the accessing is generally performed in a two way type, e.g., back and forth from one or more servers to the client devices. The broadband network may include any number of broadband links and devices, such as, for example, Internet, wireless, wireline, and fiber optic network links and devices.

The network facilitates communication between servers and various client devices. Each of the servers includes any suitable computing or processing device that can provide computing services to one or more client devices. Each of the servers may include, for example, one or more processing devices, one or more memories for storing instructions and data, and one or more network interfaces for facilitating communication over the network. For example, the servers may include servers that broadcast media data over a broadcast network in the network using HTTP techniques. In another example, the servers may include servers that broadcast media data over a broadcast network in the network using DASH.

Each client device represents any suitable computing or processing device that interacts with at least one server or other computing device(s) over the network. In this example, the regeneration client device may include a desktop computer, a mobile phone or smart phone, a personal digital assistant (PDA), a laptop computer, a tablet computer, and a set top box and/or a television. However, some other, or additional, client devices may be used in the communication system.

In this example, some client devices indirectly communicate with the network. For example, client devices communicate through one or more base stations, such as cellular base stations or eNodeBs. Also, the client devices also communicate through one or more wireless access points, such as IEEE 802.11 wireless access points. It should be appreciated that these are for illustration only and that each client device may communicate directly with the network or indirectly with the network through any suitable intermediate device(s) or network(s). As will be described in greater detail below, all or any one of the client devices may include a hybrid architecture for receiving and presenting media data using HTTP and DASH.

Figure 2:
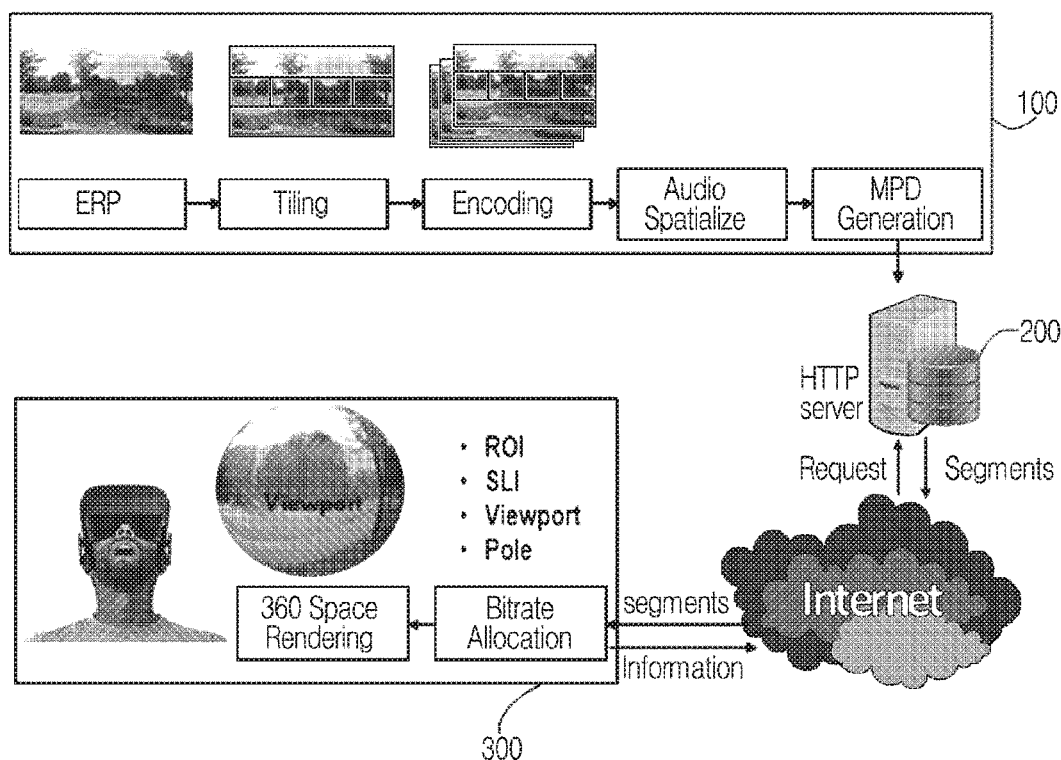
FIG. 2 is a diagram showing a configuration of a system for predicting a location of a user's viewport according to an embodiment of the present invention.

The communication system to which embodiment of the present invention is applied may include any arbitrary arrangement for each component in any suitable configuration. In general, computing and communication systems are presented in a wide variety of configurations, and FIG. 2 does not limit the scope of this disclosure to any particular configuration. FIG. 2 illustrates one operating environment in which the various features disclosed in the present specification may be used, although such characteristics may be used in any other suitable system.

In addition, in this embodiment, HTTP defines a new framework for transferring time-continuous multimedia such as audio, video, and other fixed content of widgets, files, and the like. DASH is adaptive bitrate streaming technique that enables streaming of media data provided from HTTP servers over the Internet as a receiving entity.

In this embodiment, spatial representation description (SRD) and sound localization information (SLI), which are description sets of sound source location in a three-dimensional space, are stored and transmitted to a client device with the existing image media presentation description (MPD) being extended.

In addition, according to the present embodiment, a bitrate of a segment to be provided next is determined on the basis of sound localization information (SLI), a region of interest (ROI), a current viewport, and a pole in frequency domain and is transmitted to an HTTP server.

Accordingly, it is possible to reduce an available bandwidth by allocating a high bitrate according to the present embodiment, improve the accuracy of predicting the location of the user's viewport based on the segment tile on the basis of the audio MPD and the video MPD, and ensure a user's quality of experience (QoE) for regeneration speed and regeneration quality.

FIG. 2 is a view showing a system for predicting a location of a user's viewport using location information of a sound source in 360 VR content according to an embodiment of the present invention. Referring to FIG. 2, the system for predicting a location of user's viewport includes a content production unit 100, an HTTP server, and a client device 300.

The content production unit 100 divides a panorama video in the form of an enterprise resource planning (ERP) into six images (two poles and four equators) for allocating the bitrate partially in the acquired 360 degree video and then codes six images for each resolution. That is, a video of one frame is spatially divided into multiple tiles, and then each tile is compression-coded through a high efficiency video codec (HEVC).

On the other hand, a sound source in the 360-degree space includes a spatial representation description (SRD) including azimuth angles of x, y, and z axes and altitude angles of x, y, and z axes with respect to a user's orientation.

FIG. 3 shows a description set of the SRD. Referring to FIG. 3, it may be appreciated that the SRD includes source_id (non-negative integer in a decimal representation providing an identifier for the source of the content and implicitly defining a coordinate system), object_x (non-negative integer in decimal representation expressing the horizontal location of the to corner of the associated media assets in the coordinate system), object_y (non-negative integer in decimal representation expressing the vertical location of the to corner of the associated media assets in the coordinate system), object_width (non-negative integer in decimal representation expressing the width of the associated media assets in the coordinate system), object_height (non-negative integer in decimal representation expressing the height of the associated media assets in the coordinate system), total_width (optional non-negative integer in decimal representation expressing the width of the extent of all media assets in the coordinate system), total_height (optional non-negative integer in decimal representation expressing the height of the extent of all media assets in the coordinate system), and spatial_set_id (optional non-negative integer in decimal representation providing an identifier for a group of media assets).

On the other hand, the sound source in the 360-degree space includes a head-related transfer function (HRTF) measured at the corresponding point in the sound source location of each designated SRD and sound localization information (SLI) obtained by interpolating the sound image at the point where the HRTF is not measured and localizing the sound source to the user orientation.

Here, the HRTF is a relational expression that is summarized as a function by generating the same sound in all directions and measuring the frequency response along the directions, and the HRTF value is determined differently according to the characteristics of the head body for each person. Recently, individualized HRTFs have been developed in the laboratory. The individualized HRTF data is stored in a database and used equally for users in audio output.

In addition, sound source localization information description (SLID) includes a sound source localization identifier (id), a location (x, y, z axis value) of the sound source localized in the 360-degree space, and a panning model.

FIG. 4 is a diagram showing a configuration of a sound source localization information description (SLID), and FIG. 5 is a diagram showing details of the location (x, y, z axis value) of the sound source localized in a 360-degree space shown in FIG. 4. Referring to FIGS. 4 and 5, it may be seen that the SLID includes a sound source localization identifier (id), a location (x, y, z axis value) of the sound source localized in a 360-degree space, and a panning model.

Referring to FIG. 5, the location (x, y, z axis value) of a sound source in a 360-degree space includes sound_R (information on right phase of the sound source in 360 VR content), sound_L (information on left phase of the sound source in 360 VR content), sound_spatial_hori (azimuth information as horizontal angle information for the user to sense the sound source in 360 VR content), and sound_spatial_verti (altitude information as vertical angle information for the user to sense the sound source in 360 VR content).

The video encoded for each resolution is divided into units of segments on a per-second basis and then transmitted to a HTTP server 200 together with the generated video and audio MPDs.

The HTTP server 200 stores the video divided into units of segments and the MPD including the video and audio MPDs and then transmits them to the client device 300 through the network.

Meanwhile, the client device 300 identifies the presentation time of the first access unit of the first segment in the MPD file from the 'media sync' elements by referring to the MPD associated with the media data received through the network.

Then, the client device 300 sends requests (e.g., "GET" requests) to the HTTP server 200 together with a uniform resource locator (URL) received over the network and receives media data such as the received segments as a response.

The client device 300 receives the audio and video MPDs and the segments, divides the received segments into segments on a per-second basis, and then predicts the location of the user's viewport on the basis of the video MPD and audio MPD.

The client device 300 determines a segment bitrate using a weight that is set in consideration of the ROI, the SLI, and the current viewport and makes a request for a predicted user location tile to the HTTP server 200 through the network with the determined bitrate of the segment.

Then, the client device 300 renders the video and audio received with the bitrate determined through the network from the HTTP server 200 in a 360-degree space to regenerate the video and audio.

FIG. 6 is a diagram showing a detailed configuration of the client device 300 shown in FIG. 2. Referring to FIG. 6, the client device 300 includes an MPD parser 310, a processing unit 320, and a VR engine (not shown).

Here, the MPD parser 310 transmits requests (e.g., "GET" requests) to the HTTP server 200 together with uniform resource locators (URL) received over the network and receives media data of the received segments as a response. The received media data is transmitted to the processing unit 320.

The processing unit 320 receives the audio and video MPD and segments, divides the received segments into segments on a per-second basis, predicts the location of the user's viewport on the basis of the video MPD, and predicts the sound source location on the basis of the SRD of the audio MPD.

Specifically, the processing unit 320 predicts the location of the user's viewport on the basis of the video MPD for the received segments. That is, the tile of the location of the user's viewport is derived from a yaw angle of the user orientation and a geometric value of each tile as shown in relational equation 1 below.

$$\text{if } (c-l/2 < y+f/2 < c+l/2 \| c-l/2 < y-f/2 < c+l/2) \text{ or if } (|y-c| < f/2 - l/2) \quad \text{[Equation 1]}$$

then tile∈Viewport. That is, when the above condition is satisfied, it is determined that the tile belongs to the current viewport.

Herein, y is a yaw angle of the current tile, and f is a field of view (FOV). According to the equation 1, the processing unit 320 determines that the corresponding tile is a tile set corresponding to the current viewport, when values obtained by adding and subtracting FOV(f)/2 to and from the current yaw angle y is more than a difference between the center point c of each tile and a half of a phi-length l between the start point and the end point of the azimuth angle and less than the difference between the center point c and a half of the phi-length l respectively.

On the other hand, the processing unit 320 derives a bandwidth condition on the basis of respective items of the ROI, the SLI, the current viewport, and the pole in frequency domain and derives a weight of respective items of the ROI, the SLI, the current viewport, and the pole in frequency domain in accordance with the derived bandwidth condition.

That is, the bandwidth condition r for each of items of the ROI, the SLI, the current viewport, and the pole in frequency domain is derived by minimizing a difference between the available bandwidth $R_B$ and the bitrate $\Sigma_{i=1}^{N} R_i$ of the i-th tile.

That is, $$\min_{w_x} \left( R_B - \sum_{i=1}^{N} R_i \right), \text{ s.t. } R_B > \sum_{i=1}^{N} R_i, R_i = w_x \times R_f$$

Accordingly, it is determined that the bandwidth condition r has a value of 1 to 4 that corresponds to very good, good, bad, and very bad, respectively.

The weights of respective items of the ROI, the SLI, the current viewport, and the pole in frequency domain for each bandwidth condition are shown in the following Table 1, in which the weights for respective items are stored in advance in the processing unit 320 as look-up table values.

TABLE 1

| Bandwidth Condition | ROI | SLI | Viewport | Pole | Weight (w) |
|---|---|---|---|---|---|
| Very good | 2 | 2 | 2 | 2 | 2:2:2:2 |
| Good | 2 | 2 | 2 | 1 | 2:2:2:1 |
| Bad | 2 | 2 | 1 | 1 | 2:2:1:1 |
| Very bad | 2 | 2 | 1 | 0 | 2:2:1:0 |

FIG. 7 is a view showing an operation procedure of an algorithm for deriving a bitrate $R_i$ for each bandwidth condition corresponding to an image set R. Referring to FIG. 7, it is possible to derive a bitrate $R_i$ for each bandwidth condition corresponding to the image set R with an algorithm.

Herein, R is a tile in which an object detected by YOLO V3 in a video in the form of an enterprise resource planning (ERP) is located, a tile in which a sound source localized in a three-dimensional space is located as a video set in which a sound source is localized, and V is a tile corresponding to the current viewport derived from the yaw angle y of the user orientation and the video-specific geometry value, and P is a video set in which a pitch angle θ of the user orientation is below 60 degrees and equal to or greater than 120 degrees.

(1) For the video set R divided into N tiles, when a rank r derived from the sum of weights of respective items of the ROI, the SLI, the current viewport, and the pole in frequency domain is one, the processing unit 320 determines that the bandwidth condition is very good and sets the weight $w_S$ of the tile corresponding to the SLI, the weight $w_R$ of the tile corresponding to the ROI, the weight $w_V$ of the tile corresponding to the current viewport, and the weight $w_P$ of the tile corresponding to the pole as the maximum weight set $w_X$.

Accordingly, for the video set R, the bitrate $R_i$ of the i-th tile is derived from the total sum of products of the maximum weight max $w_X$, the i-th tile $t_i$, and the reference bitrate $R_f$, as shown in equation 2 below. Herein, i is a positive integer from 1 to N.

$$\Sigma_{i=1}^{N} R_i = \Sigma_{i=1}^{N}(\max(w_x)^* t_i{}^* R_f) \quad \text{[Equation 2]}$$

On the other hand, when the rank r derived from the sum of weights of respective items of the ROI, the SLI, the current viewport, and the pole in frequency domain is two, the processing unit 320 determines that the bandwidth condition good, sets the weight $w_S$ of the tile corresponding to the SLI, the weight $W_R$ of the tile corresponding to the ROI, and the weight $w_V$ of the tile corresponding to the current viewport as the maximum weight set max $w_X$, and sets the weight $w_P$ of the tile corresponding to the pole as a value of max $w_X-1$ obtained by subtracting one from the maximum weight set max $w_X$.

Accordingly, for the video set R, the bitrate $R_i$ is calculated by adding a product of the sum (S+R+V) of the tiles of each of the ROI, the SLI, and the current viewport, the reference bitrate $R_f$, and the maximum weight max $w_X$ and a product of tile P of the pole in frequency domain, the reference bitrate $R_f$, and a value of max $w_X-1$ obtained by subtracting one from the maximum weight set max $w_X$, in which the segment bitrate $R_i$ for the video set R satisfies an equation 3 below.

$$\Sigma_{i=1}^{N} R_i = \Sigma((S+R+V)^* R_f{}^* \max(w_x) + P^* R_f{}^*(\max(w_x)-1)) \quad \text{[Equation 3]}$$

(3) When the rank r derived from the sum of the weights of respective items of the ROI, the SLI, the current viewport, and the pole in frequency domain is three, the processing unit 320 determines that the bandwidth condition is bad, sets the weight $w_S$ of the tile corresponding to the SLI and the weight $w_R$ of the tile corresponding to the ROI as the maximum weight set max $w_X$, and sets the weight $w_V$ of the tile corresponding to the current viewport and the weight $w_P$ of the tile corresponding to the pole as a value of max $w_X-1$ obtained by subtracting one from the maximum weight set max $w_X$.

The bitrate $R_i$ for the image set R is calculated by adding a product of the sum S+R of tiles of each times of the ROI and the SLI, the reference bitrate $R_f$, and the maximum weight max $w_X$, and a product of the sum V+P of the tile V of the current viewport and the tile P in the pole in frequency domain, the reference bitrate $R_f$, and a value of max $w_X-1$ obtained by subtracting 1 from the maximum weight set max $w_X$, in which the bitrate $R_i$ for the video set R satisfies an equation 4 below.

$$\Sigma_{i=1}^{N} R_i = \Sigma((S+R)^* R_f{}^* \max(w_x) + (P+V)^* R_f{}^*(\max(w_x)-1)) \quad \text{[Equation 4]}$$

(4) When the rank r derived from the sum of the weights of respective items of the ROI, the SLI, the current viewport, and the pole in frequency domain is four, the processing unit 320 determines that the bandwidth condition is very bad, sets the weight $w_S$ of the tile corresponding to the SLI and the weight $w_R$ of the tile corresponding to the ROI as the maximum weight set $w_X$, sets the weight $w_V$ of the tile corresponding to the current viewport as a value of max $w_X-1$ obtained by subtracting one from the maximum weight set max $w_X$, and sets the weight $w_P$ of the tile corresponding to the pole as a value of max $w_X-2$ obtained by subtracting two from the maximum weight set max $w_X$.

Accordingly, the bitrate $R_i$ for the image set R is derived by adding a product of the sum S+R of the tiles of the ROI and the SLI, the reference bitrate $R_f$, and the maximum weight max $w_X$, a product of the tile V of the current viewport, the reference bitrate $R_f$, and a value of max $w_X-1$ obtained by subtracting one from the maximum weight set max $w_X$, and a product of the tile P of the pole in frequency domain, the reference bitrate $R_f$, and a value of max $w_X-2$ obtained by subtracting two from the maximum weight set max $w_X$, in which the bitrate $R_i$ for the video set R satisfies an equation 5 below.

$$\Sigma_{i=1}^{N} R_i = \Sigma((S+R)^* R_f{}^* \max(w_x) + V^* R_f{}^*(\max(w_x)-1) + P^* R_f{}^*(\max(w_x)-2)) \quad \text{[Equation 5]}$$

Herein, the indexes of the equations 2 to 5 are summarized as shown in Table 2 below.

TABLE 2

| Index | Denote |
|---|---|
| $R_B$ | Available bandwidth |
| $R_i$ | Bitrate of i-th tile (video) ($r \in \{1, 2, \ldots, N\}$) |
| $R_f$ | Reference bitrate |
| $w_X$ | Set of weights ($w_X \in \{1, 2, 3\}$) |
| $w_S$ | Weight of tile (image) corresponding to SLI |
| $w_R$ | Weight of tile (image) corresponding to ROI |
| $w_V$ | Weight of tile (image) corresponding to user's current viewport |
| $w_P$ | Weight of tile (image) corresponding to pole |
| $t_i$ | i-th tile (image) |
| r | Rank of sum of weights (bandwidth condition) ($r \in \{1, 2, 3, 4\}$) |
| S | Set of tiles (images) corresponding to SLI ($t_i \in \{SLI\}$) |
| R | Set of tiles (images) corresponding to ROI ($t_i \in \{ROI\}$) |
| V | Set of tiles (images) corresponding to viewport ($t_i \in \{viewport\}$) |
| P | Set of tiles (images) corresponding to pole ($t_i \in \{Pole\}$) |

In addition, the processing unit 320 determines the bitrate of the segment on the basis of the weights that are set in consideration with the ROI, the SLI, the current viewport, and the pole in frequency domain and makes a request for location tile of the user's viewport predicted using the determined bitrate of the segment to the HTTP server 200 through the network.

Accordingly, when the bandwidth condition of the client is good, it is possible to make a request for the highest quality segment at a high bitrate that is determined in consideration with all items of the ROI, the SLI, the current viewport, and the pole in frequency domain in order to determine the segment bitrate. However, when the bandwidth condition is not good, it is possible to make a request for a tile segment at a bitrate that is determined by an item having a higher weight among the items above-described, whereby it is possible to make a request for a segment adaptively in accordance with the bandwidth, thereby improving the segment quality.

The processing unit 320 allocates weights to respective items of the sound localization information (SLI), the region of interest (ROI), the current viewport, and the pole accordance with the bandwidth condition, multiplies the bitrate $R_f$ by the weights to determine a segment bitrate $R_i$ to be requested next, and transmits the next request for a segment to the HTTP server 200 at the determined segment bitrate $R_i$.

Then, the HTTP server 200 transmits the requested segment tile with the bandwidth allocated at the determined segment bitrate Ri to the processing unit 320 through the network, and the processing unit 320 processes the received segment and transmits the processed segments to the VR engine 330, and the VR engine 330 renders the video and audio of the segments processed in the processing unit 320 in a 360-degree space to be regenerated.

Specifically, the VR engine 330 receives the segments, decodes them using the appropriate decoders, and then renders and regenerates the decoding results into media data that may be displayed on a display. In non-limiting examples, it is possible to overlay personalized ad information time and location synchronized with the display of relevant associated broadcast media data and/or provide picture-in-picture data of streamed broadband media content positioned in a corner of the display and time synchronized with a relevant associated portion of displayed broadcast media data.

The present embodiment is configured to transmit the sound source localization information (SLI) of the audio MPD with the existing video MPD being extended, differentially allocate weights for the respective items of the region of interest (ROI), the sound source localization information (SLI), the current viewport, and the pole, and the weights are multiplied by a reference bitrate to determine a segment bitrate to be provided next, and then receive the segment at the determined segment bitrate. Accordingly, it is possible to improve the accuracy of predicting the location of the user's viewport by utilizing the visual and auditory perception, and when the prediction of the location of the user's viewport fails, the location of the user's viewport can be predicted considering the location of the user's current viewport, thereby ensuring the quality of experience (QoE) for regeneration speed and regeneration quality.

A method of predicting a location of a user's viewport using location information of a sound source in 360 virtual reality (VR) content according to other aspect of the present invention includes (a) by a content production unit, spatially dividing a panorama video in a form of an enterprise resource planning (ERP) into multiple segment tiles to generate an MPD for each tile and compression-coding the generated MPD and the segment tiles at resolutions for respective tiles to transmit the resulting in a form of media data to a HTTP server; (b) by the HTTP server, dividing the received media data into segments on a per-predefined time basis in accordance with a MPD request command together with a uniform resource locator (URL) included in the MPD received through a network and then transmitting the MPD including a video MPD and an audio MPD and the segment tiles to a client device with a reference bandwidth of the network; (c) by the client device, predicting the location of the user's viewport on the basis of the segment tiles and the video MPD and the audio MPD received through the network, determining a segment bitrate to be provided next adaptively on the basis of bandwidth condition, and making a request for a segment tile in the location of the user's viewport predicted at the determined segment bitrate to the HTTP server; (d) by the HTTP server, transmitting a segment to be provided next to the client device with an allocated bandwidth provided by the client device; and (e) by the client device, performing decoding on the segment tiles transmitted through the network to acquire video and audio, and rendering the acquired video and audio in a 360-degree space to be regenerated.

The audio MPD includes spatial representation description (SRD) and sound localization information (SLI), in which the SRD includes source_d (non-negative integer in a decimal representation providing an identifier for a source of content and implicitly defining a coordinate system), object_x (non-negative integer in decimal representation expressing a horizontal location of a top-left corner of associated media assets in the coordinate system), object_y (non-negative integer in decimal representation expressing a vertical location of a top-left corner of the associated media assets in the coordinate system), object_width (non-negative integer in decimal representation expressing a width of the associated media assets in the coordinate system), object_height (non-negative integer in decimal representation expressing a height of the associated media assets in the coordinate system), total_width (optional non-negative integer in decimal representation expressing a width of the extent of all media assets in the coordinate system), total_height (optional non-negative integer in decimal representation expressing a height of the extent of all media assets in the coordinate system), and spatial_set_id (optional non-negative integer in decimal representation providing an identifier for a group of media assets).

A sound localization information description (SLID) includes: a sound source localization identifier (SLI_id) a location (x, y, z axis value) of the sound source in a 360-degree space having sound_R (information on right phase of the sound source in 360 VR content), sound_L (information on left phase of the sound source in 360 VR content), sound_spatial_hori (horizontal angle information for a user to sense the sound source in 360 VR content), and sound_spatial_verti (vertical angle information for the user to sense, and a panning model.

In addition, the step (c) is configured to determine the segment bitrate to be provided next on the basis of a weight of a tile for at least one item of a region of interest (ROI), sound source localization information (SLI), a current viewport, and a pole, a reference bitrate, a rank for each bandwidth condition, and tiles located in the ROI, the SLI, the current viewport, and the pole, and transmit the determined bitrate to the HTTP server.

In addition, the weights in the step (c) are stored in such a manner as to be matched to respective items of the ROI, the SLI, the current viewport, and the pole that are predetermined for each bandwidth condition.

The step (c) is provided to determine that the bandwidth condition is very good when a rank r derived from the sum of weights of respective items is one, set each of the weight $w_S$ of the tile corresponding to the SLI, the weight $w_R$ of the tile corresponding to the ROI, the weight $w_V$ of the tile corresponding to the current viewport, and the weight $w_P$ of the tile corresponding to the pole as a maximum weight set $w_X$, and derive a bitrate $R_i$ of an i-th tile from the total sum of products of the maximum weight max $w_X$, the i-th tile $t_i$, and the reference bitrate $R_f$.

The step (c) is provided to determine that the bandwidth condition is good when the rank r derived from the sum of weights of respective items is two, set the weight $W_S$ of the tile corresponding to the SLI, the weight $w_R$ of the tile corresponding to the ROI, and the weight $w_V$ of the tile corresponding to the current viewport as the maximum weight set max $w_X$ and set the weight $w_P$ of the tile corresponding to the pole as a value of max $w_X$–1 obtained by subtracting one from the maximum weight set max $w_X$, and derive the segment bitrate $R_i$ by adding a product of the sum (S+R+V) of the tiles of each of the ROI, the SLI, and the current viewport, the reference bitrate $R_f$, and the maximum weight max $w_X$ and a product of tile P of the pole in frequency domain, the reference bitrate $R_f$, and a value of max $w_X$–1 obtained by subtracting one from the maximum weight set max $w_X$.

The step (c) is provided to determine that the bandwidth condition is bad when the rank r derived from the sum of the weights of respective items is three, set the weight $w_S$ of the tile corresponding to the SLI and the weight $w_R$ of the tile corresponding to the ROI as the maximum weight set max $w_X$ and set the weight $w_V$ of the tile corresponding to the current viewport and the weight $w_P$ of the tile corresponding to the pole as a value of max $w_X$–1 obtained by subtracting one from the maximum weight set max $w_X$, and derive the segment bitrate $R_i$ for the image set R by adding a product of the sum S+R of tiles of each times of the ROI and the SLI, the reference bitrate $R_f$ and the maximum weight max $w_X$ and a product of the sum V+P of the tile V of the current viewport and the tile P in the pole in frequency domain, the reference bitrate $R_f$, and a value of max $w_X$–1 obtained by subtracting 1 from the maximum weight set max $w_X$.

The step (c) is provided to determine that the bandwidth condition is very bad when the rank r derived from the sum of the weights of respective items is four, set the weight $w_S$ of the tile corresponding to the SLI and the weight $w_R$ of the tile corresponding to the ROI as the maximum weight set $w_X$, set the weight of the tile corresponding to the current viewport as a value of max $w_X$–1 obtained by subtracting one from the maximum weight set max $w_x$, and set the weight $w_P$ of the tile corresponding to the pole as a value of max $w_X$–2 obtained by subtracting two from the maximum weight set max $w_X$, and derive the segment bitrate $R_i$ for the image set R by adding a product of the sum S+R of the tiles of the ROI and the SLI, the reference bitrate $R_f$, and the maximum weight max $w_X$, a product of the tile V of the current viewport, the reference bitrate $R_f$ and a value of max $w_X$–1 obtained by subtracting one from the maximum weight set max $w_X$, and a product of the tile P of the pole in frequency domain, the reference bitrate $R_f$ and a value of max $w_X$–2 obtained by subtracting two from the maximum weight set max $w_X$.

Each step of a method of predicting a location of a user's viewport using location information of a sound source in 360 degree VR content are performed in the content production unit 100, the HTTP server 200, the client device 300, the MPD parser 310, the processing unit 320, and the VR engine 330, and thus detailed explanations thereof are omitted.

According to the present invention, the spatial representation description (SRD) and the sound source localization information (SLI) of the audio MPD are transmitted with the video MPD being extended, the SRD of the sound source is used to derive the location of the sound source, and the weights of the respective items of the region of interest (ROI), the sound source localization information (SLI), the current viewport, and the pole are allocated differentially according to the bandwidth condition and then multiplied by the reference bitrate to determine the segment bitrate to be provided next, whereby as the next segment tile is received at the determined segment bitrate, it is possible to improve the accuracy of predicting the location of the user's viewport by utilizing the visual and auditory perception and when the prediction of the location of the user's viewport fails, the location of the user's viewport can be predicted considering the location of the user's current viewport, thereby ensuring the quality of experience (QoE) for regeneration speed and regeneration quality.

While the present invention has been described in connection with what is presently considered to be the most practical and preferred embodiments, it is to be understood that the invention is not limited to the disclosed embodiments, but on the contrary, is intended to cover various modifications and equivalent arrangements included within the sprit and scope of the invention. For example, it should be understood that suitable results may be achieved even though the techniques described may be performed in a different order than the described methods, and/or that components of the described systems, structures, devices, circuits, and the like are coupled or combined in a different type than the described methods or replaced or substituted by other components or an equivalents. Therefore, the scope of the present invention should not be construed as being limited to the embodiments described, but should be determined by the scope of the appended claims, as well as the appended claims.

According to a system and method of predicting a location of a user's viewport using location information of a sound source in 360 degree VR content of the present invention, the spatial representation description (SRD) and the sound source localization information (SLI) of the audio MPD are transmitted with the video MPD being extended, the SRD of the sound source is used to derive the location of the sound source, and the weights of the respective items of the region of interest (ROI), the sound source localization information (SLI), the current viewport, and the pole are allocated differentially according to the bandwidth condition and then multiplied by the reference bitrate to determine the segment bitrate to be provided next, whereby as the next segment the is received at the determined segment bitrate, it is possible to improve the accuracy of predicting the location of the user's viewport by utilizing the visual and auditory perception and when the prediction of the location of the user's viewport fails, the location of the user's viewport can be predicted considering the location of the user's current viewport, thereby ensuring the quality of experience (QoE) for regeneration speed and regeneration quality. As a result, a great improvement is brought about in terms of the accuracy and reliability of operation and further performance efficiency, and the system for providing the VP service has a sufficient possibility of being marketed or operated, whereby the present invention has an industrial applicability.

What is claimed is:

1. A system for predicting a location of a user's viewport using location information of a sound source in 360 virtual reality (VR) content, the system comprising:

a content production unit spatially dividing a panorama video into multiple segment tiles to generate an MPD including a video media presentation description (MPD) and an audio MPD, compression-coding the generated MPD and the segment tiles at resolutions determined for respective tiles to be transmitted in a form of media data;

a HTTP server dividing the received media data into segments on a per-predefined time basis, transmitting the generated MPD including the video MPD and the audio MPD and the segment tiles with a reference bandwidth of a network, and then collecting next segment tiles on the basis of a MPD request command provided through the network to transmit the segment tiles and the MPD; and a client device generating the MPD request command together with a uniform resource locator (URL) included in the MPDs received through the network to be transmitted to the HTTP server, predicting the location of the user's viewport on the basis of the segment tiles and the video MPD and the audio MPD received through the network, determining a segment bitrate to be provided next adaptively on the basis of bandwidth conditions, and transmitting the determined segment bitrate to the HTTP server, wherein the client device includes:

a MPD parser parsing the MPD through the network;

a processing unit predicting the location of the user's viewport on the basis of the video MPD and the audio MPD of the parsed MPD and determining a segment bitrate to be provided next adaptively on the basis of the bandwidth conditions to transmit the determined bitrate of the segment to the HTTP server; and a VR engine decoding the segment received through the processing unit to acquire audio and video and three-dimensionally rendering the acquired audio and video in the 360-degree space to be regenerated, and wherein the processing unit is configured to determine the segment bitrate to be provided next on the basis of a weight of a tile for at least one item of a region of interest (ROI), sound source localization information (SLI), a current viewport, and a pole, a reference bitrate, a rank for each bandwidth condition, and tiles located in the ROI, the SLI, the current viewport, and the pole, and transmit the determined bitrate to the HTTP server.

2. The system of claim 1, wherein the weights in the processing unit are stored in such a manner as to be matched to respective items of the ROI, the SLI, the current viewport, and the pole that are predetermined for each bandwidth condition.

3. The system of claim 2, wherein the processing unit is provided to determine that the bandwidth condition is very good when a rank r derived from the sum of weights of respective items is one, set each of the weight ws of the tile corresponding to the SLI, the weight wr of the tile corresponding to the ROI, the weight wv of the tile corresponding to the current viewport, and the weight wp of the tile corresponding to the pole as a maximum weight set wx, and derive a bitrate $R_i$ of an i-th tile from the total sum of products of the maximum weight max wx, the i-th tile $t_i$, and the reference bitrate $R_f$.

4. The system of claim 2, wherein the processing unit is provided to determine that the bandwidth condition is good when the rank r derived from the sum of weights of respective items is two, set the weight ws of the tile corresponding to the SLI, the weight wr of the tile corresponding to the ROI, and the weight wv of the tile corresponding to the current viewport as the maximum weight set max wx and set the weight wp of the tile corresponding to the pole as a value of max wx −1 obtained by subtracting one from the maximum weight set max wx, and derive the segment bitrate $R_i$ by adding a product of the sum (S+R+V) of the tiles of each of the ROI, the SLI, and the current viewport, the reference bitrate $R_f$, and the maximum weight max wx and a product of tile P of the pole in frequency domain, the reference bitrate $R_f$ and a value of max $w_x$−1 obtained by subtracting one from the maximum weight set max wx.

5. The system of claim 2, wherein the processing unit is provided to determine that the bandwidth condition is bad when the rank r derived from the sum of the weights of respective items is three, set the weight ws of the tile corresponding to the SLI and the weight wr of the tile corresponding to the ROI as the maximum weight set max wx and set the weight wv of the tile corresponding to the current viewport and the weight wp of the tile corresponding to the pole as a value of max $w_x$−1 obtained by subtracting one from the maximum weight set max wx, and derive the segment bitrate $R_i$ for the image set R by adding a product of the sum S +R of tiles of each times of the ROI and the SLI, the reference bitrate $R_f$, and the maximum weight max $w_x$ and a product of the sum V +P of the tile V of the current viewport and the tile P in the pole in frequency domain, the reference bitrate $R_f$, and a value of max $w_x$−1 obtained by subtracting 1 from the maximum weight set max $w_x$.

6. The system of claim 2, wherein the processing unit is provided to determine that the bandwidth condition is very bad when the rank r derived from the sum of the weights of respective items is four, set the weight ws of the tile corresponding to the SLI and the weight wr of the tile corresponding to the ROI as the maximum weight set wx, set the weight wv of the tile corresponding to the current viewport as a value of max $w_x$−1 obtained by subtracting one from the maximum weight set max wx, and set the weight wp of the tile corresponding to the pole as a value of max $w_x$−2 obtained by subtracting two from the maximum weight set max wx, and derive the segment bitrate $R_i$ for the image set R by adding a product of the sum S +R of the tiles of the ROI and the SLI, the reference bitrate $R_f$ and the maximum weight max wx, a product of the tile V of the current viewport, the reference bitrate $R_f$ and a value of max $w_x$−1 obtained by subtracting one from the maximum weight set max wx, and a product of the tile P of the pole in frequency domain, the reference bitrate $R_f$ and a value of max $w_x$−2 obtained by subtracting two from the maximum weight set max wx.

7. The system of claim 1, wherein the audio MPD includes spatial representation description (SRD) and sound localization information (SLI), in which the SRD includes source_id (non-negative integer in a decimal representation providing an identifier for a source of content and implicitly defining a coordinate system), object_x (non-negative integer in decimal representation expressing a horizontal location of a top-left corner of associated media assets in the coordinate system), object_y (non-negative integer in decimal representation expressing a vertical location of a top-left corner of the associated media assets in the coordinate system), object_width (non-negative integer in decimal representation expressing a width of the associated media assets in the coordinate system), object_height (non-negative integer in decimal representation expressing a height of the associated media assets in the coordinate system), total_width (optional non-negative integer in decimal representation expressing a width of the extent of all media assets in the coordinate system), total_height (optional non-negative integer in decimal representation expressing a height of the extent of all media assets in the coordinate system), and spatial_set_id (optional non-negative integer in decimal representation providing an identifier for a group of media assets).

8. The system of claim 7, wherein a sound localization information description (SLID) includes:
 a sound source localization identifier (SLI_id),
 a location (x, y, z axis value) of the sound source in a 360-degree space having sound_R (information on right phase of the sound source in 360 VR content), sound_L (information on left phase of the sound source in 360 VR content), sound_spatial_hori (horizontal angle information for a user to sense the sound source in 360 VR content), and sound_spatial_verti (vertical angle information for the user to sense, and a panning model.

9. A method of predicting a location of a user's viewport using location information of a sound source in 360 virtual reality (VR) content, the method comprising:
 (a) by a content production unit, spatially dividing a panorama video into multiple segment tiles to generate an MPD for each tile and compression-coding the generated MPD and the segment tiles at resolutions for respective tiles to transmit the resulting in a form of media data to a HTTP server;
 (b) by the HTTP server, dividing the received media data into segments on a per-predefined time basis in accordance with a MPD request command together with a uniform resource locator (URL) included in the MPD received through a network and then transmitting the MPD including a video MPD and an audio MPD and the segment tiles to a client device with a reference bandwidth of the network;
 (c) by the client device, predicting the location of the user's viewport on the basis of the segment tiles and the video MPD and the audio MPD received through the network, determining a segment bitrate to be provided next adaptively on the basis of bandwidth condition, and making a request for a segment tile in the location of the user's viewport predicted at the determined segment bitrate to the HTTP server;
 (d) by the HTTP server, transmitting a segment to be provided next to the client device with an allocated bandwidth provided by the client device; and
 (e) by the client device, performing decoding on the segment tiles transmitted through the network to acquire video and audio, and rendering the acquired video and audio in a 360-degree space to be regenerated,
 wherein the audio MPD includes spatial representation description (SRD) and sound localization information (SLI),
 in which the SRD includes source_id (non-negative integer in a decimal representation providing an identifier for a source of content and implicitly defining a coordinate system), object_x (non-negative integer in decimal representation expressing a horizontal location of a top-left corner of associated media assets in the coordinate system), object_y (non-negative integer in decimal representation expressing a vertical location of a top-left corner of the associated media assets in the coordinate system), object_width (non-negative integer in decimal representation expressing a width of the associated media assets in the coordinate system), object_height (non-negative integer in decimal representation expressing a height of the associated media assets in the coordinate system), total_width (optional non-negative integer in decimal representation expressing a width of the extent of all media assets in the coordinate system), total_height (optional non-negative integer in decimal representation expressing a height of the extent of all media assets in the coordinate system), and spatial_set_id (optional non-negative integer in decimal representation providing an identifier for a group of media assets),
 wherein a sound localization information description (SLID) includes:
 a sound source localization identifier (SLI_id),
 a location (x, y, z axis value) of the sound source in a 360-degree space having sound_R (information on right phase of the sound source in 360 VR content), sound_L (information on left phase of the sound source in 360 VR content), sound_spatial_hori (horizontal angle information for a user to sense the sound source in 360 VR content), and sound_spatial_verti (vertical angle information for the user to sense, and
 a panning model,
 wherein the step (c) is configured to
 determine the segment bitrate to be provided next on the basis of a weight of a tile for at least one item of a region of interest (ROI), sound source localization information (SLI), a current viewport, and a pole, a reference bitrate, a rank for each bandwidth condition, and tiles located in the ROI, the SLI, the current viewport, and the pole, and
 transmit the determined bitrate to the HTTP server,
 wherein the weights in the step (c) are stored in such a manner as to be matched to respective items of the ROI, the SLI, the current viewport, and the pole that are predetermined for each bandwidth condition, and
 wherein the step (c) is provided to
 determine that the bandwidth condition is very good when a rank r derived from the sum of weights of respective items is one,
 set each of the weight $w_S$ of the tile corresponding to the SLI, the weight $w_R$ of the tile corresponding to the ROI, the weight $w_V$ of the tile corresponding to the current viewport, and the weight $w_P$ of the tile corresponding to the pole as a maximum weight set $w_X$, and
 derive a bitrate $R_i$ of an i-th tile from the total sum of products of the maximum weight max $w_X$, the i-th tile $t_i$, and the reference bitrate $R_f$.

10. The method of claim 9, wherein the step (c) is provided to determine that the bandwidth condition is good when the rank r derived from the sum of weights of respective items is two, set the weight $w_S$ of the tile corresponding to the SLI, the weight $w_R$ of the tile corresponding to the ROI, and the weight $w_V$ of the tile corresponding to the current viewport as the maximum weight set max $w_X$ and set the weight $w_P$ of the tile corresponding to the pole as a value of max $w_X-1$ obtained by subtracting one from the maximum weight set max $w_X$, and derive the segment bitrate $R_i$ by adding a product of the sum (S+R+V) of the tiles of each of the ROI, the SLI, and the current viewport, the reference bitrate $R_f$, and the maximum weight max $w_X$ and a product of tile P of the pole in frequency domain, the reference bitrate $R_f$, and a value of max $w_X-1$ obtained by subtracting one from the maximum weight set max $w_X$.

11. The method of claim 9, wherein the step (c) is provided to determine that the bandwidth condition is bad when the rank r derived from the sum of the weights of respective items is three, set the weight $w_S$ of the tile corresponding to the SLI and the weight $w_R$ of the tile corresponding to the ROI as the maximum weight set max $w_X$ and set the weight $w_V$ of the tile corresponding to the current viewport and the weight $w_P$ of the tile corresponding to the pole as a value of max $w_X-1$ obtained by subtracting one from the maximum weight set max $w_X$, and derive the segment bitrate $R_i$ for the image set R by adding a product of the sum S+R of tiles of each times of the ROI and the SLI, the reference bitrate $R_f$, and the maximum weight max $w_X$ and a product of the sum V+P of the tile V of the current viewport and the tile P in the pole in frequency domain, the reference bitrate $R_f$, and a value of max $w_X-1$ obtained by subtracting 1 from the maximum weight set max $w_X$.

12. The method of claim 9, wherein the step (c) is provided to determine that the bandwidth condition is very bad when the rank r derived from the sum of the weights of respective items is four, set the weight $w_S$ of the tile corresponding to the SLI and the weight $w_R$ of the tile corresponding to the ROI as the maximum weight set $w_X$, set the weight $w_V$ of the tile corresponding to the current viewport as a value of max $w_X-1$ obtained by subtracting one from the maximum weight set max $w_X$, and set the weight $w_P$ of the tile corresponding to the pole as a value of max $w_X-2$ obtained by subtracting two from the maximum weight set max $w_X$, and derive the segment bitrate $R_i$ for the image set R by adding a product of the sum S+R of the tiles of the ROI and the SLI, the reference bitrate $R_f$, and the maximum weight max $w_X$, a product of the tile V of the current viewport, the reference bitrate $R_f$, and a value of max $w_X-1$ obtained by subtracting one from the maximum weight set max $w_X$, and a product of the tile P of the pole in frequency domain, the reference bitrate $R_f$, and a value of max $w_X-2$ obtained by subtracting two from the maximum weight set max $w_X$.

* * * * *